(12) United States Patent
Maruko et al.

(10) Patent No.: US 6,415,230 B1
(45) Date of Patent: Jul. 2, 2002

(54) METHOD AND APPARATUS FOR ASSISTING VEHICLE OPERATOR BRAKING ACTION OF A VEHICLE

(75) Inventors: Naoki Maruko, Kanagawa; Minoru Tamura, Yokohama; Akihiko Kobayashi, Kanagawa; Hideaki Inoue, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/640,792

(22) Filed: Aug. 18, 2000

(30) Foreign Application Priority Data

Sep. 6, 1999 (JP) .......................................... 11-251971

(51) Int. Cl.⁷ ............................................... B60Q 1/22
(52) U.S. Cl. ........................... 701/301; 701/30; 701/70; 701/96; 340/901; 340/71; 340/435; 340/436; 342/70; 342/129
(58) Field of Search ............................ 701/301, 30, 70, 701/96; 340/463, 435, 436, 903, 901, 71; 180/169, 170, 167, 171; 342/70, 129; 345/39; 362/555

(56) References Cited

U.S. PATENT DOCUMENTS

| 4,412,701 A | | 11/1983 | Burckhardt ................. 303/6 R |
| 5,165,497 A | * | 11/1992 | Chi ............................ 180/169 |
| 5,530,651 A | * | 6/1996 | Uemura et al. ............. 701/301 |
| 5,731,977 A | | 3/1998 | Taniguchi et al. .......... 701/301 |
| 5,754,099 A | * | 5/1998 | Nishimura et al. ......... 340/435 |
| 5,924,508 A | | 7/1999 | Clauss et al. ............... 180/179 |
| 5,983,161 A | | 11/1999 | Lemelson et al. .......... 701/301 |
| 6,070,682 A | * | 6/2000 | Isogai et al. ................ 180/167 |
| 6,084,508 A | * | 7/2000 | Mai et al. ................... 340/463 |
| 6,169,478 B1 | * | 1/2001 | Hada et al. ................. 340/435 |
| 6,259,985 B1 | * | 7/2001 | Sielagoski et al. ........... 701/96 |
| 6,272,418 B1 | * | 8/2001 | Shinmura et al. ............. 701/72 |

FOREIGN PATENT DOCUMENTS

| DE | 196 07 048 A1 | 8/1997 |
| DE | 197 50 913 A1 | 5/1998 |
| DE | 197 38 690 A1 | 3/1999 |
| JP | 63-130453 | 6/1988 |
| JP | 6-24302 | 2/1994 |
| JP | 7-144588 | 6/1995 |
| WO | WO 99/20508 | 4/1999 |

\* cited by examiner

*Primary Examiner*—William A. Cuchlinski, Jr.
*Assistant Examiner*—Tuan C To
(74) *Attorney, Agent, or Firm*—Foley & Lardner (57) ABSTRACT

A method and apparatus for assisting operation by a vehicle operator for braking of a vehicle includes a detection system on the vehicle, which detects obstacles located in or near the direction of motion of the vehicle. Vehicle condition sensors on the vehicle provide characteristic parameters of the condition of the vehicle. Operator demand sensors, which are operatively associated with a brake pedal and an accelerator pedal, provide operator demands on the vehicle. A control unit determines whether or not braking action by the vehicle operator is needed from data concerning the obstacles, the characteristic parameters of vehicle condition and the operator demands on the vehicle and determines a target stand-by brake pressure. The control unit is operable to generate a command for adjustment of brake pressure to the determined stand-by brake pressure. A braking system on the vehicle is operable by the vehicle operator. The braking system is operable in response to the command to trigger stand-by brake pressure regulation upon determination that braking action by the vehicle operator is needed.

29 Claims, 11 Drawing Sheets

METHOD AND APPARATUS FOR ASSISTING VEHICLE OPERATOR BRAKING ACTION OF A VEHICLE

BACKGROUND OF THE INVENTION

The present invention relates to methods and apparatuses for assisting vehicle operator braking action of a vehicle.

To enhance safety of a car and passengers in present-day road traffics, efforts are being made to support the operator in routine driving operations.

In this direction, antilock braking systems (ABS) have been proposed and adopted to enhance longitudinal vehicle stability in dynamically critical conditions in braking process.

"Automatic distance regulation" (ADR) systems have been proposed that are intended to detect and carry out a controlled braking action to control the distance of a vehicle from other vehicles and/or stationary objects in the direction of vehicle motion. JP-A 7-144588 discloses a system whereby traveling speed and deceleration of a vehicle in front are determined using a Doppler sensor and a vehicle speed sensor, which are on a vehicle to be controlled, and a safe distance from the vehicle in front is determined in response comparison of the traveling speed of the vehicle in front with a predetermined value of 15 km/h. In this system, a driver is warned and an automatic braking action is initiated if the distance from the vehicle in front becomes less than the safe distance.

Other systems have been proposed that are intended to initiate braking action before the operator of a vehicle initiates braking action. JP-A 6-24302 discloses a system whereby, when a foot of the operator leaves an accelerator pedal, two micro switches are both closed to energize a solenoid for activating a brake pedal. Energizing the solenoid pulls the brake pedal to partially activate a braking system before the foot of the operator is stepped on the brake pedal.

A disadvantage of such systems as disclosed in JP-A 7-144588 and JP-A 6-24302 is that the correction of the motion of a vehicle takes place consistently and with no opportunity for the operator to exercise control. Because of the requirements of the regulating algorithm, a controlling action by such systems will take place quite early so that the braking action need not be executed too abruptly. Hence, the systems will respond even in situations that a practiced operator would have negotiated himself with no problems. As a result, the operator will experience a repeated automatic intervention in the control of the vehicle, which is actually necessary in only a few cases from his or her point of view, and will consider such intervention as unwarranted interference so that such systems are unlikely to meet with much acceptance.

SUMMARY OF THE INVENTION

Accordingly, it is an object of the present invention to provide a vehicle operator braking action assisting method and apparatus, which overcome the disadvantage of the prior art.

Another object of the present invention is to provide a method and apparatus of this kind that will prevent a vehicle operator from considering a repeated automatic intervention in the control of the vehicle as unwarranted interference without sacrificing the advantages of a vehicle operator braking action assisting system.

For this purpose, in a method or an apparatus according to the present invention, a detection system on a vehicle to be controlled detects obstacles, which are in or near the direction of motion of the vehicle, and provides corresponding data to a control unit. In addition, the vehicle has, or certain of its components are provided with, vehicle condition sensors for detecting characteristic parameters of the condition or state of motion of the vehicle and transmitting data regarding these parameters to the control unit, and vehicle operator demand sensors for detecting characteristic parameters of the power or brake demand of the operator and transmitting data regarding these parameters to the control unit. From the data reported concerning the obstacles, the vehicle condition parameters and the operator demand parameters, the control unit ascertains a whether a braking action by the vehicle operator is needed. The control unit determines a target stand-by brake pressure and generates a command for adjustment of brake pressure to the target stand-by pressure. The apparatus includes a braking system operable by the vehicle operator. The braking system has a temporary stand-by state in which brake pressure is adjusted toward the target brake pressure. The braking system is operable to make a shift to the stand-by state only after the control unit has determined that braking action by the vehicle operator is needed. In the stand-by state, the brake pressure as high as the target stand-by brake pressure actuates the brake, producing minimum possible vehicle deceleration. Since the brake pressure will drop to zero or disappear upon termination of the stand-by state and the vehicle deceleration produced in the stand-by state is at required minimum level unnoticeable by the vehicle operator, the vehicle operator is prevented from considering such an automatic intervention in the control of the vehicle as unwarranted interference without sacrificing the advantages of a vehicle operator braking action assisting system.

It is especially advantageous if the apparatus includes an antilock braking system and/or an electronic dynamic regulating system, since in that case the motion of the vehicle will be more controllable even during braking and under critical road conditions. Since such systems are now standard equipment in many vehicles, the apparatus for assisting vehicle operator braking action may advantageously be combined with or integrated into such conventional systems.

The arrangement for detecting the condition of the vehicle includes sensors for detecting traveling speed of the vehicle (or vehicle speed) and weight of the vehicle.

The arrangement may include sensors and a control unit to determine the coefficient of force transmission, i.e., the traction, between the vehicle tires and the roadway, so that the prevailing road conditions can be detected. In this way, readings for maximum possible target stand-by brake pressure can be so derived, which may be subject to variations even during the temporary stand-by state, for example if the roadway is wet or slippery.

As sensors for detection of power or brake demand of the vehicle operator, conventional sensors for detecting whether a brake pedal of the braking system is depressed or released and for detecting stroke of an accelerator pedal are used.

As sensors for detection of the obstacles located in or near the direction of motion of the vehicle, conventional radar sensors employing laser, whose application is familiar to those skilled in the art, are used, However, any other types of sensors that permit an adequate preview of the range of motion of the vehicle and which are suitable for service under rough vehicle condition may be used.

In one embodiment, the control unit continuously detects a traveling speed of a vehicle to be controlled and continuously calculates a distance from a vehicle in front, relative speed, and a criterion distance based on the traveling speed, the distance and the relative speed. If the criterion is transgressed, i.e., the distance becomes equal to or less than the criterion distance, the control unit determines that braking action by the vehicle operator is needed and triggers stand-by brake pressure regulation in the temporary stand-by state. The stand-by state is terminated when the control unit subsequently determines depression of the brake pedal or when the control unit subsequently determines that the distance from the vehicle in front becomes greater than the criterion distance. In the stand-by state, the control unit continuously determines the target stand-by pressure as a function of the traveling speed and weight of the vehicle, and the brake pressure as high as the target stand-by pressure is applied to the brake. According to this function, the target stand-by pressure is relatively high at higher speeds, while it is relatively low at low speeds, and at intermediate speeds, with the same speed, the target stand-by pressure becomes higher as weight of the vehicle becomes heavier. The target stand-by pressure so derived provides vehicle deceleration, which is less noticeable to the vehicle operator in the stand-by state.

In a further embodiment, after determining that braking action by the vehicle operator is needed, the control unit determines the state of emergency of imminent braking action based on release speed of accelerator pedal in its stroke toward its release position. If the accelerator pedal is released after the control unit has determined that braking action by the vehicle operator is needed, in the stand-by state, the control unit continuously determines the instantaneous release speed of the accelerator pedal in its stroke toward its released position to find out the maximum release speed of the accelerator pedal and determines target stand-by pressure as a function of the maximum release speed of accelerator pedal and weight of the vehicle, and the brake pressure as high as the target stand-by pressure is applied to the brake. According to this function, the target stand-by pressure is relatively high at relatively high emergency, while it is relatively low at low emergency, and at intermediate emergency, with the same degree of emergency, the target stand-by pressure becomes higher as weight of the vehicle becomes heavier. The target stand-by pressure so derived provides vehicle deceleration of satisfactorily high level immediately after depression of the brake pedal.

In a still further embodiment, a control unit continuously detects a traveling speed of a vehicle to be controlled and continuously calculates a distance from a vehicle in front, relative speed, and a target deceleration based on the traveling speed, the distance and the relative speed. The target deceleration is deceleration at which the vehicle is to be decelerated to maintain a minimum spacing with the vehicle in front. If the target deceleration becomes greater, in magnitude, than a preset criterion deceleration (0.6G in this example), the control unit determines that braking action by the vehicle operator is needed. Then, control unit determines whether or not the accelerator pedal is depressed. If the accelerator pedal is not depressed upon or immediately after determination that the target deceleration is greater than the criterion deceleration, the control unit initiates temporary stand-by state. The stand-by state is terminated when the control unit subsequently determines depression of the brake pedal or when the control unit subsequently determines depression of the accelerator pedal. In the stand-by state, the control unit determines once a reading of the traveling speed upon determining that the accelerator pedal is not depressed after determining that braking action by the vehicle operator is needed, The control unit determines the target stand-by pressure as a function of the reading of the traveling speed of the vehicle and the vehicle weight, and the brake pressure as high as the target stand-by pressure is applied to the brake. If, subsequently, the brake and accelerator pedal are left at their released positions, respectively, the target stand-by pressure so derived is unaltered for a preset period of time (1 second in this example) and then drops toward zero level at a gradual rate or immediately.

In a still another embodiment, the control unit incorporates, in calculation of the target stand-by brake pressure, currently determined coefficient of force transmission, i.e., the traction, between the vehicle tires and the roadway so that the target stand-by brake pressure becomes low as the coefficient becomes small In a still further embodiment, the control unit incorporates, in calculation of the target stand-by brake pressure, currently determined speed ratio in the transmission so that the target stand-by brake pressure becomes high as the speed ratio decreases. In this case, the target stand-by pressure is at the maximum level at the first speed ratio. As the speed ratio increases toward the direct drive, the target stand-by brake pressure becomes low. Altering the target stand-by pressure in this manner has the advantage that deceleration due to the target stand-by pressure is less perceived by the vehicle operator in the circumstance of deceleration due to engine braking process.

It is of advantage if the environmental data from the obstacle detection system and/or the signals from vehicle condition sensors and operator demand sensors are stored in a memory. This has the advantage that the parameters leading to initiating stand-by state for braking function are available for subsequent analysis and especially desirable to the manufacture of the motor vehicles for reasons of product liability analysis.

It is of advantage if a camera, which is preferably mounted in the region of the inside rear view mirror of the vehicle, is provided so that an accident event can be observed visually and the video signal generated by the camera can be stored in the memory. Providing such a camera has the advantage that an accident event can be analyzed from the point of view of the driver and subsequently evaluated.

BRIEF DESCRIPTION OF THE DRAWINGS

Further objects and advantages of the invention will be apparent from reading of the following description in conjunction with the accompanying drawings.

DESCRIPTION OF THE PREFERRED EMBODIMENTS

Figure 1:
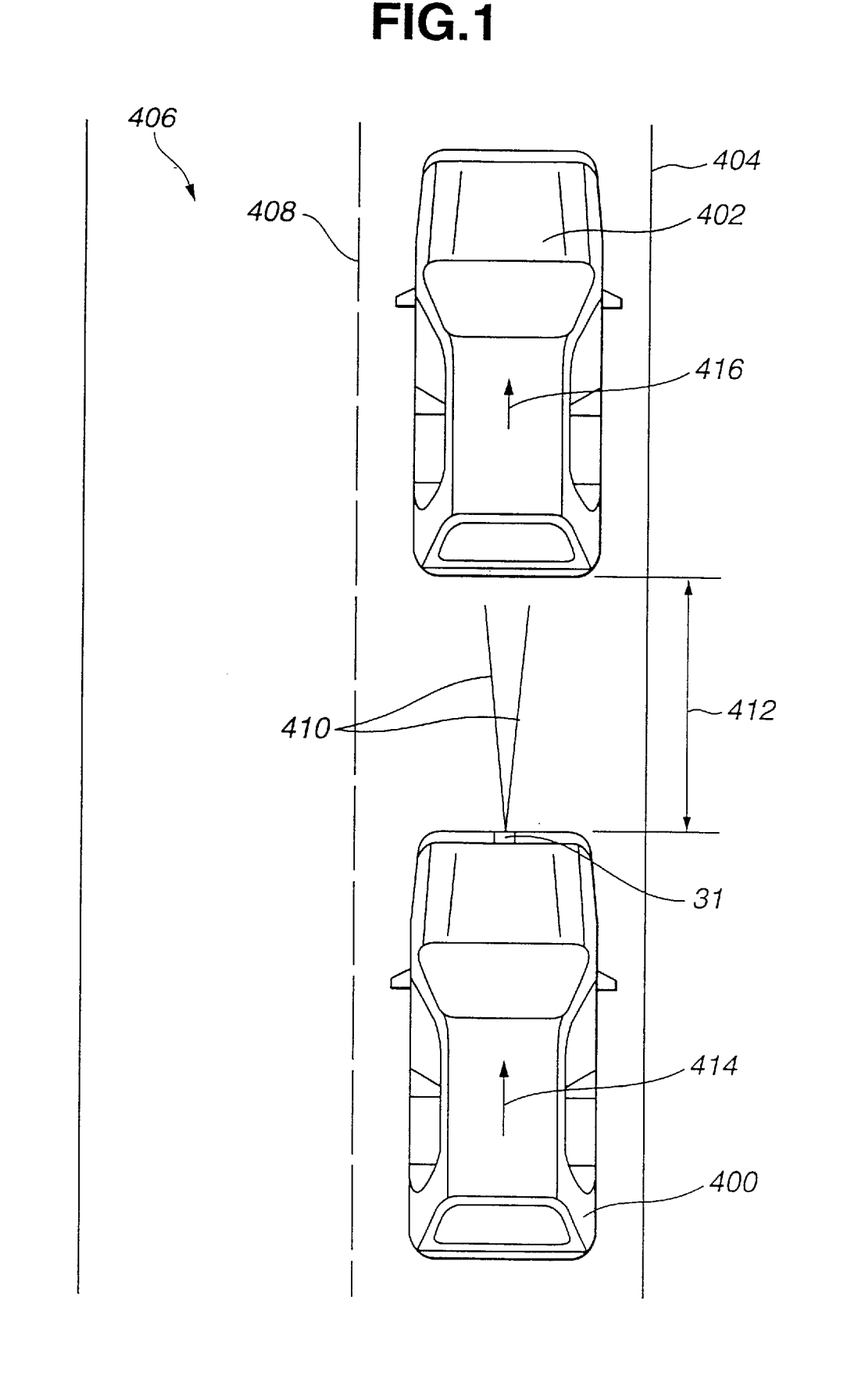
FIG. 1 is a plan view of a potential impact situation on a straightway.

FIG. 1 shows a typical impact situation on a straightway 406 having an edge 404 and a centerline 408, in which a fast moving vehicle 400, moving at an initial velocity in the direction of an arrow 414, is approaching a slow moving vehicle 402 from behind. Vehicle 402 is moving at a velocity in the direction of an arrow 416. In FIG. 1, arrows 414 and 416 are vectors so that their lengths represent the magnitude of the velocities. In the front portion of vehicle 400, a detection system or unit 3, shown schematically, scans the roadway 406 for obstacles within an angular field 410. In this case, vehicle 402 in front is located inside field 410 and vehicle 400 is spaced at a distance 412 behind vehicle 402. On the basis of evaluation of the environmental data from detection system 31 and signals from sensors (not shown in FIG. 1) on vehicle 400, a control unit 29 (see FIG. 2) will recognize the illustrated situation as a situation in which braking action by the operator is needed and initiate regulation of stand-by brake pressure applied to the brake in stand-by state of a braking system 430 for assisting the operator in actuating the brake.

Figure 2:
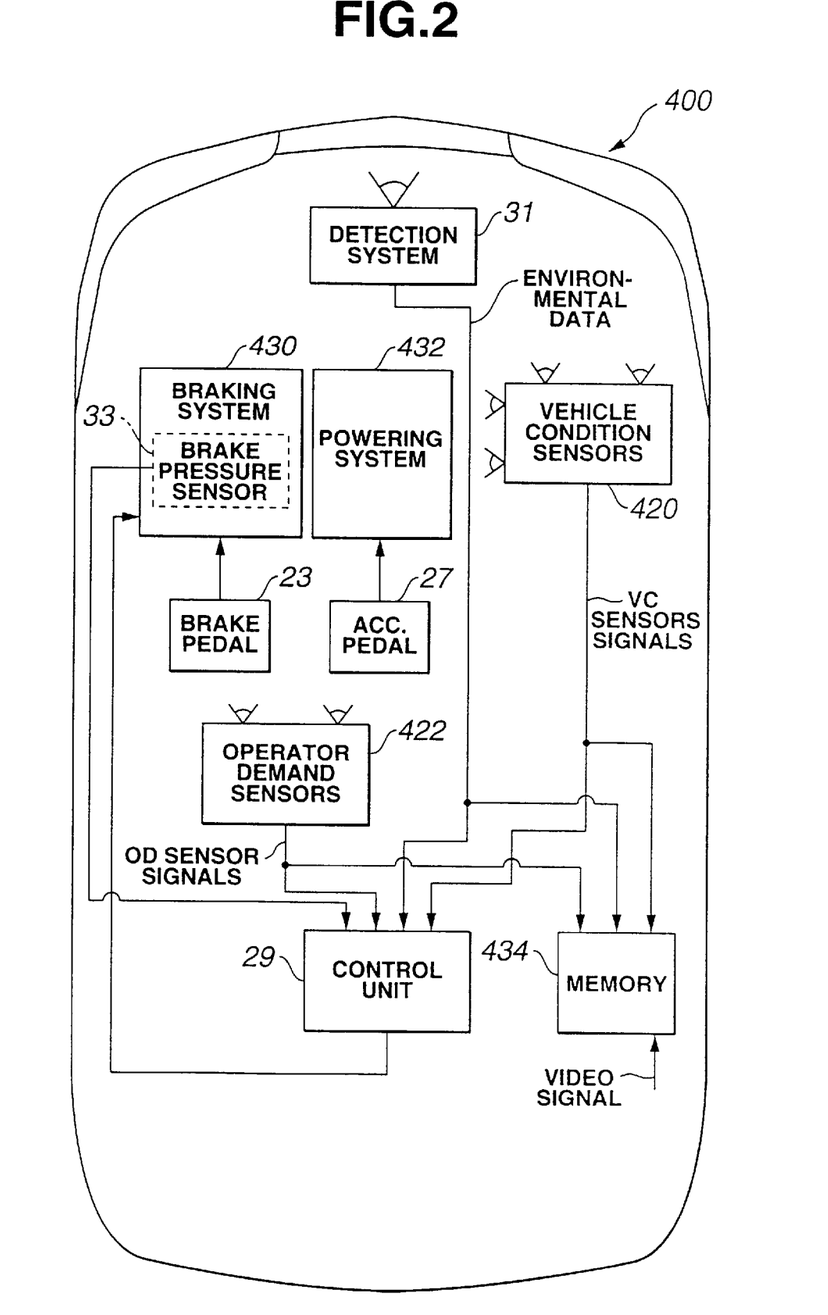
FIG. 2 is a schematic block diagram showing the arrangement of one representative implementation of a vehicle operator braking action assisting system according to the present invention.

FIG. 2 is a schematic diagram showing an arrangement for determining that braking action by the operator is needed and generating command for regulating stand-by brake pressure applied to the brake in stand-by state of braking system 430. For this purpose, environmental data furnished by detection system 31, signals from vehicle condition sensors 420 and signals from operator demand sensors 422 are supplied to control unit 29. In the simplest case, some of these data are used for determination of a criterion distance L0. If this criterion is transgressed, i.e., the distance 412 (see FIG. 1) is equal to or less than L0, the control unit 29 regards the illustrated situation as a situation in which braking action by the operator is needed, determines target stand-by brake pressure and generates a command for adjustment of brake pressure to the target stand-by brake pressure. In response to this command, the braking system 430 is held in stand-by state in which brake pressure applied to the brake is adjusted to the target stand-by brake pressure. Operator demand sensors include a sensor for detecting operator deceleration demand expressed through a brake pedal 23 of braking system and a sensor for detecting operator power demand expressed through an accelerator pedal 27 of a powering system 432, i.e., a power train including an internal combustion engine and a transmission.

If desired, provision is made so that the environmental data furnished by the detection system 31 and the signals from sensors 420 and 422 are stored in a memory 434. This has the advantage that, in the event of a traffic accident that was not avoidable by braking action by the operator, the environmental data and the sensor signals correlated with this accident are available for subsequent analysis. Such knowledge of the environmental data and sensor signals preceding the braking action by the operator and/or a traffic accident is not only of advantage for a traffic investigation of the accident but also to provide accurate knowledge of the parameters that led to triggering stand-by braking function. This is of significance in view of potential product liability of the motor vehicle manufacture and/or the manufacture of the braking system of a vehicle.

In order to supplement the data delivered by detection system 31 and sensors 420 and 422 with a visual representation of the traffic accident, it is possible for memory 434 to record video signal from a camera, not shown. The camera is located in the region of the inside rear view of the motor vehicle so that the video signal from the camera recorded in memory 434 represents the accident essentially from the point of view of the operator of the vehicle.

Figure 3:
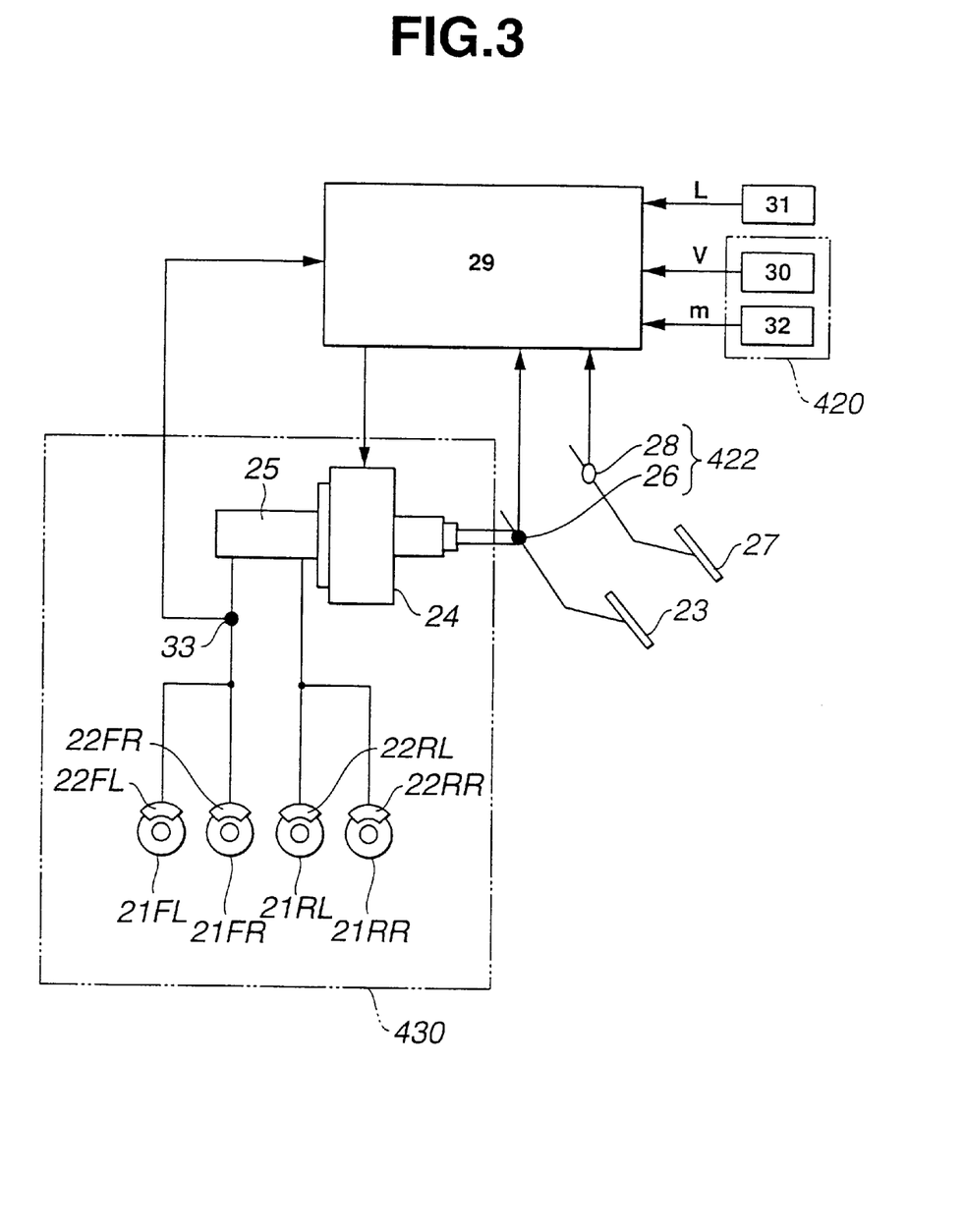
FIG. 3 is a schematic block diagram showing one example of a braking system that may be employed in the vehicle operator braking action assisting system.
Figure 4:
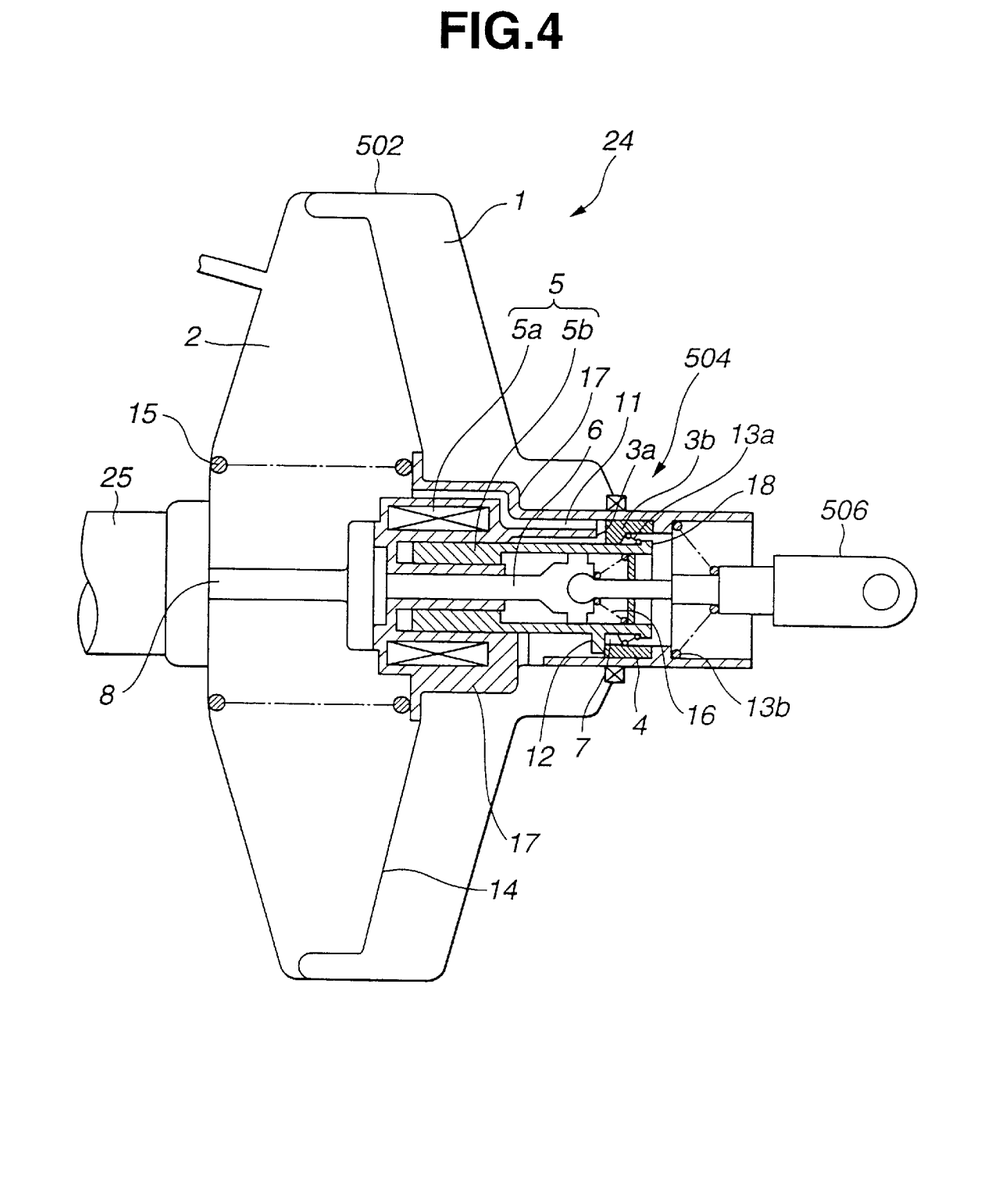
FIG. 4 is a schematic sectional view of a brake booster of the braking system shown in FIG. 3.

Referring to FIGS. 3 and 4, vehicle condition sensors 420 include a vehicle speed sensor 30 and a load sensor 32. Vehicle speed sensor 30 is provided to detect traveling speed V of vehicle 400 and to generate a vehicle speed signal corresponding to the detected traveling speed. Load sensor 32 is located between a body structure of vehicle 400 and a suspension system thereof for detecting vehicle body weight m to provide a vehicle weight signal. Load sensor 32 utilizes load sensing valves for measuring front load supported by front road wheels and rear load supported by rear road wheels, which are used for calculation of vehicle body weight m. Operator demand sensors 422 include a brake switch 26 and an accelerator stroke sensor 28. Brake switch 26 is operatively connected to brake pedal 23. Specifically, brake switch 26 is connected to a rod-shaped actuator 506 of brake booster 24 of braking system 430. The setting is such that brake switch 26 has an off-state when brake pedal 23 is released and has an on-state when brake pedal 23 is depressed. Accelerator stroke sensor 28 detects instantaneous stroke La(n) of accelerator pedal 27 and generates an accelerator stroke signal. Obstacle detection system 31 includes a distance detection sensor for detecting a distance L from an obstacle, including a vehicle, in front and generates a distance signal Detection system 31 includes a laser radar or a millimeter wave radar. In the example shown in FIG. 3, braking system 430 includes a master brake cylinder 25 to be actuated by brake booster 24. Master brake cylinder 25 is connected to wheel cylinders or actuators of front wheel brakes 22FL and 22FR, which are provided for deceleration of front left and front right road wheels 21FL and 21FR, respectively. Similarly, master brake cylinder 25 is connected to wheel cylinders or actuators of rear left and rear right brakes 22RL and 22RR, which are provided for deceleration of rear left and rear right road wheels 21RL and 21RR. Brake pressure sensor 33 detects brake pressure delivered from master brake cylinder 25 and generates a brake pressure signal. The signal from brake pressure sensor 33 is supplied to control unit 29 and utilized in adjustment of brake pressure to the target stand-by pressure.

Referring to FIG. 4, the illustrated brake booster 24 includes an electro-magnetically operable control valve arrangement 504. Control unit 29 supplies control valve arrangement 504 with brake actuator (BA) command for adjusting brake pressure to target stand-by pressure. Brake booster 24 comprises an essentially rotation symmetrical housing 502, in which a rear chamber 1 and a front chamber 2 are arranged and separated from each other by a movable wall 14. Control valve arrangement 504 is coupled with movable wall 14 for a common relative movement with respect to housing 502. The front end of a rod-shaped actuation member 506, which is coupled with brake pedal 23, acts on control valve arrangement 504.

Within brake booster 24, a power output member 8 is arranged which bears against control valve arrangement 504. Power output member 8 is provided for activation of master brake cylinder 25.

Control valve arrangement 504 comprises an essentially tubular valve housing 17. The front end of valve housing 17 is coupled to movable wall 14. A return spring 15 arranged within brake booster 24 resiliently biases the control valve arrangement 504 rearwardly. Within valve housing 17 an electromagnetic actuator 5 is arranged which includes a solenoid coil 5a and a plunger 5b. Arranged within plunger 5b is an operating rod 6. The front end of operating rod 6 bears against power output member 8. A return spring 16 located within plunger 5b has one end bearing against a retainer (no numeral) fixedly connected to plunger 5b and opposite end bearing against the rear end of operating rod 6. The front end ball of rod-shaped actuator 506 is fixedly inserted into socket recessed inwardly from the rear end of operating rod 6. A return spring 13b located within valve housing 17 has one end bearing against a shoulder of valve housing 17 and opposite end bearing against a shoulder of rod-shaped actuator 506.

Valve housing 17 is formed with a passage 11 through which fluid communication between rear and front chambers 1 and 2 is established. The front end of passage 11 is always open to front chamber 2, while the rear end of passage 11 is located within a valve seat 3a. Valve seat 3a is located within an annular space defined between plunger 5b and valve housing 17 and faces a valve member 3b that forms an upper portion of a slide. The slide is located between plunger 5b and valve housing 17. A return spring 13a has one end bearing against an integral abutment 18 of plunger 5b and opposite end bearing against the slide. An air admission port 7 is formed through a lower portion of the slide. This lower portion of the slide serves as a valve seat 4. Port 7 is provided to admit ambient air into rear chamber 1. Valve seat 4 formed with port 7 faces a valve member 12 integral with plunger 5b. Valve seat 3a and valve member 3b cooperate with each other to form an interruption or vacuum valve. Valve seat 4 and valve member 12 cooperate with each other to form an ambient air admission valve.

In the rest position shown with the vacuum source disconnected, atmospheric pressure prevails in both chambers 1 and 2. With the vacuum source connected, i.e., with the engine running, a vacuum is built up in front chamber 2 so that movable wall 14 together with the control valve arrangement 504 is slightly displaced in a forward direction. Accordingly, a new pressure balance is achieved between two chambers 1 and 2. From this position, a lost travel free activation of the brake booster 24 is ensured.

Under a normal brake actuation by the vehicle operator, the brake booster 24 operates in a usual manner by interrupting the connection between two chambers 1 and 2 via the interruption valve (3a, 3b) and admitting ambient air into rear chamber 14 via the ambient air admission valve (12, 4).

Electromagnetic actuator 5 can actuate control valve arrangement 504. For this purpose, current through solenoid 5a is regulated in response to brake actuator (BA) command furnished by control unit 29. This BA command causes a displacement of control valve arrangement 504 so that ambient air can flow into rear chamber 1.

Referring back to FIG. 3, distance L (412 in FIG. 1), traveling speed V of vehicle 400 and weight m of vehicle 400 are fed to control unit 29. From these data, control unit 29 continuously calculates criterion distance L0. If distance L becomes equal to or less than this criterion L0 when brake pedal 23 is released, control unit 29 determines that braking action by the vehicle operator is needed. This determination triggers brake pressure regulation to adjust brake pressure Pb to target stand-by brake pressure Pst, Brake pressure Pb detected by brake pressure sensor 33 is fed to control unit 29. This brake pressure regulation is carried out by regulating current through solenoid 5a of electromagnetic actuator 5. Control unit 29 determines target stand-by pressure from a travelling speed V0 upon determination that braking action by the vehicle operator is needed and weight m.

Figure 5:
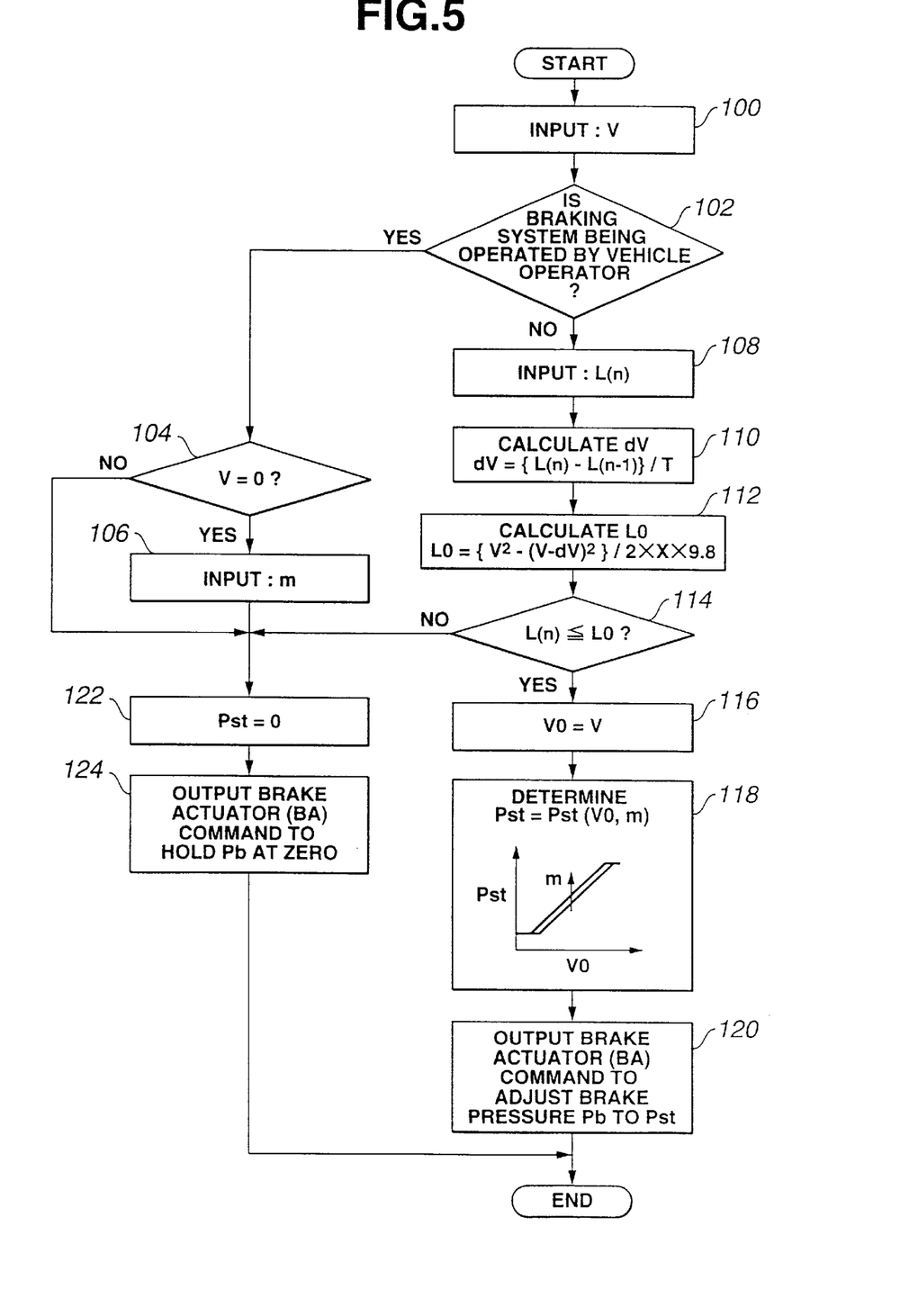
FIG. 5 is a flow chart of a control routine for regulating target stand-by brake pressure applied to the brake in stand-by state, illustrating one embodiment of stand-by braking process.

The flow chart of FIG. 5 illustrates a control routine implementing the present invention.

This control routine is executed at regular interval of 10 milliseconds by timer interruption. At step 100, control unit 29 inputs traveling speed V from vehicle speed sensor 30. At the next interrogation step 102, control unit 29 determines whether or not braking system 430 is being operated by the vehicle operator, i. e., whether or not the signal from brake switch 26 is on-state. If brake switch 26 is at on-state so that brake pedal 23 is being depressed, the routine proceeds to interrogation step 104. At step 104, control unit 29 determines whether or not travelling speed V is equal to zero. If this is the case (V=0) indicating that the vehicle is at standstill, the routine proceeds to step 106. At step 106, control unit 29 inputs the vehicle body weight m from load sensor 32. The routine proceeds from step 106 to step 122. If, at step 104, V is greater than zero (V>0), the routine passes step 106 and proceeds directly to step 122.

At step 122, control unit 29 sets target stand-by brake pressure Pst equal to zero (Pst=0). At the next step 124, control unit 29 outputs brake actuator (BA) command to hold brake pressure Pb at zero before terminating this cycle of time interruption. In response to this BA command, no current is supplied to electromagnetic actuator 5 of brake booster 24.

If, at step 102, control unit 29 determines that brake switch 26 is at off-state so that brake pedal 23 is released, the routine proceeds to step 108. At step 108, control unit 29 inputs current distance L(n), which is furnished by detection system 31, from an obstacle or vehicle 402 located in the direction of motion of vehicle 400. At the next step 110, control unit 29 calculates relative speed dV from the current distance L(n), the previous distance L(n−1) and time interval T(=10 milliseconds) between two consecutive time interruptions. Relative speed dV can be expressed as, $$dV=\{L(n)-L(n-1)\}/T \qquad (1).$$

Then, at step 112, control unit 29 determines criterion distance L0 from traveling speed V and relative speed dV by calculating the following equation, $$L0=\{V^2-(V-dV)^2\}/2 \times X \times 9.8 \qquad (2)$$

where: X represents emergency criterion deceleration, which is 0.6 G in this embodiment.

At the next step 114, control unit 29 determines whether or not distance L(n) is equal to or less than L0. If L(n)>L0 indicating that braking action by the vehicle operator is not needed, the routine proceeds to step 122 and then to step 124. If, at step 114, L(n)≦L0 so that control unit 29 determines that braking action by the vehicle operator is needed, the routine proceeds to step 116. At step 116, control unit 29 sets current speed V as V0. At the next step 118, control unit 29 determines target stand-by brake pressure Pst by performing a table look-up operation of the map illustrated in FIG. 6 using V0 and m. The routine proceeds to step 120 after determining target stand-by brake pressure Pst. At step 120, control unit 29 outputs BA command that has been determined to reduce a deviation between actual brake pressure Pb and target brake pressure Psr. In response to this BA command, current passing through electromagnetic actuator 5 is regulated to adjust actual brake pressure Pb to target stand-by brake pressure Pst.

Figure 6:
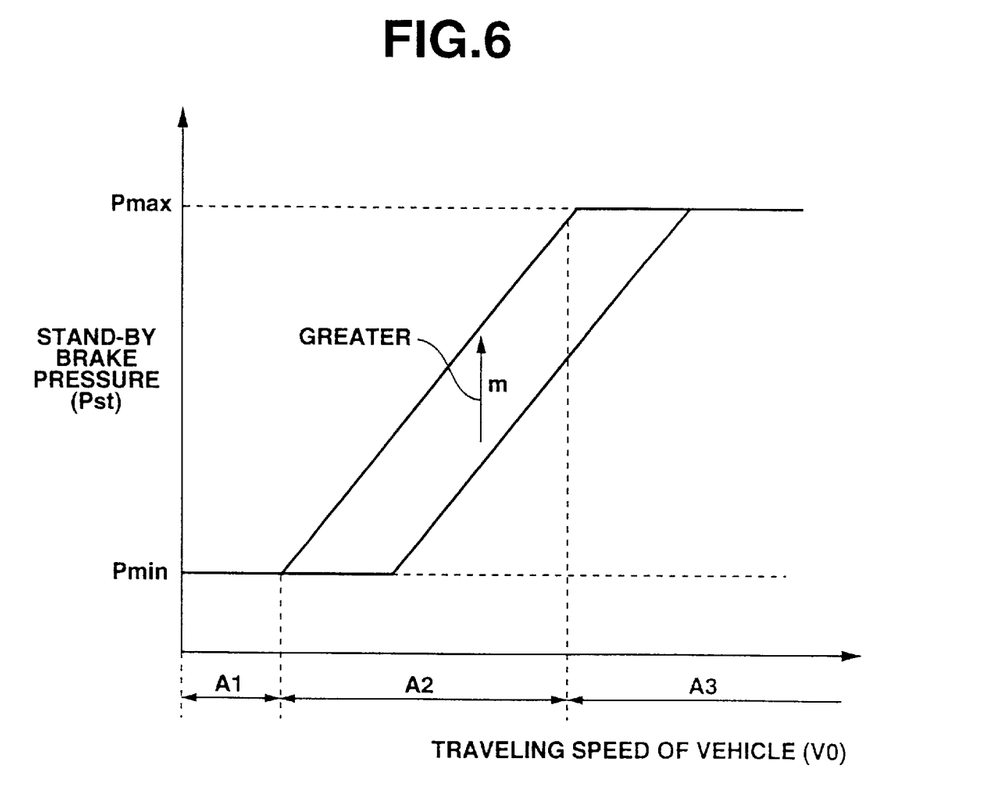
FIG. 6 is a characteristic diagram illustrating a map used in calculation of target stand-by brake pressure in the control routine of FIG. 5.

Referring to FIG. 6, the illustrated Pst characteristic against V0 and m was prepared on the recognition that, with the same stand-by pressure Pst, deceleration perceived by the vehicle operator becomes less as travelling speed V0 becomes greater, and also on the recognition that, with the same stand-by brake pressure, deceleration perceived by the vehicle operator becomes less as the weight m becomes greater. The characteristic is such that Pst has its minimum value Pmin over low speed range A1 and it has its maximum value Pmax over high speed range A3. Over intermediate speed range A2, Pst varies between Pmin and Pmax and is proportional to V0. As illustrated by an arrow in FIG. 6, stand-by pressure Pst is corrected with vehicle weight m such that at the same speed, stand-by pressure Pst drops as weight m drops.

Figure 7:
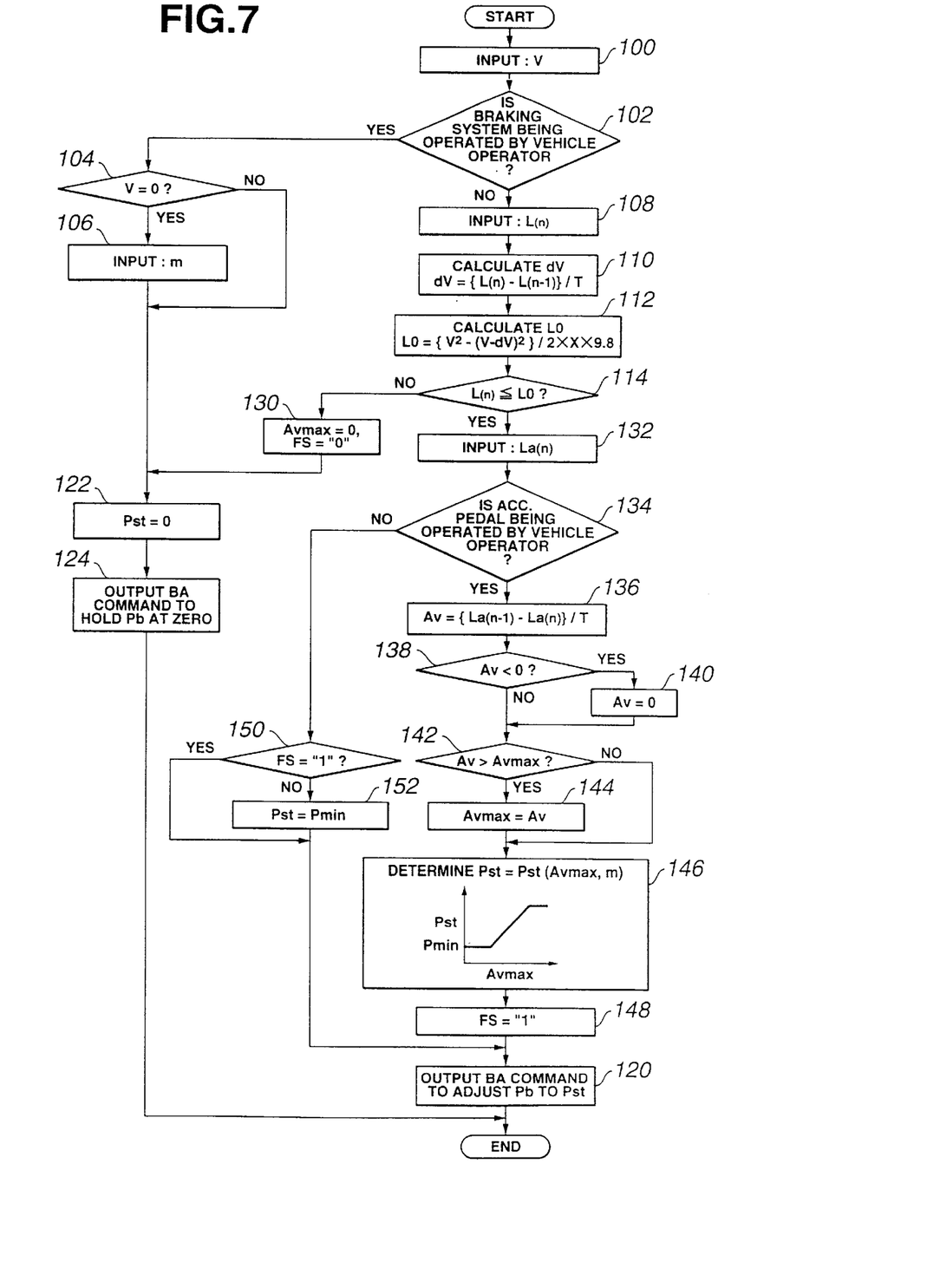
FIG. 7 is a flow chart of a control routine for regulating target stand-by brake pressure applied to the brake in stand-by state, illustrating another embodiment of stand-by braking process.

The flow chart of FIG. 7 illustrates another control routine implementing the present invention. This control routine is substantially the same as the previously described control routine except the manner of determining target stand-by brake pressure Pst. Comparing FIG. 7 with FIG. 5 reveals that a new step 130 is disposed in a flow from a negative (NO) terminal of step 114 to step 122 and new steps 132, 134, 136, 138, 140, 142, 144, 146, 148, 159 and 152 have replaced steps 116 and 118 (see FIG. 5) and disposed between an affirmative (YES) terminal of step 114 and step 120.

In FIG. 7, if the interrogation at step 114 results in negative (L(n)>L0), the routine proceeds to step 130 prior to step 122. At step 130, control unit 29 rests accelerator release speed maximum value Avmax equal to 0 (zero) and resets a state representative flag FS equal to 0 (zero). Then, the routine proceeds to step 122.

If, at step 114, L(n)≦L0, the routine proceeds to step 132. At step 132, control unit 29 inputs accelerator stroke La(n) from accelerator stroke sensor 28. At the next step 134, control unit 29 determines whether or not accelerator pedal 27 is being operated by vehicle operator by determining whether or not accelerator stroke L(n) is greater than zero. If this is the case so that accelerator pedal 27 is being depressed, the routine proceeds to step 136. At step 136, control unit 29 determines an accelerator pedal release speed Av by calculating the following equation, $$Av = \{La(n-1) - La(n)\}/T \qquad (3),$$

where: La(n−1) represents previous accelerator stroke, and La(n) represents current accelerator stroke.

At the next step 138, control unit 29 determines whether or not Av is less than 0 (zero). If this is the case, control unit 29 sets Av equal to 0 (zero) at step 140 and the routine proceeds to step 142. If, at step 138, Av is not less than 0 (zero), the routine proceeds to step 142.

At step 142, control unit 29 determines whether or not Av is greater than a maximum accelerator release speed Avmax. If this is the case, the routine proceeds to step 144. At step 144, control unit 29 updates Avmax with the current Av and the routine proceeds to step 146. If, at step 142, Av≦Avmax, the routine proceeds directly to step 146.

Figure 8:
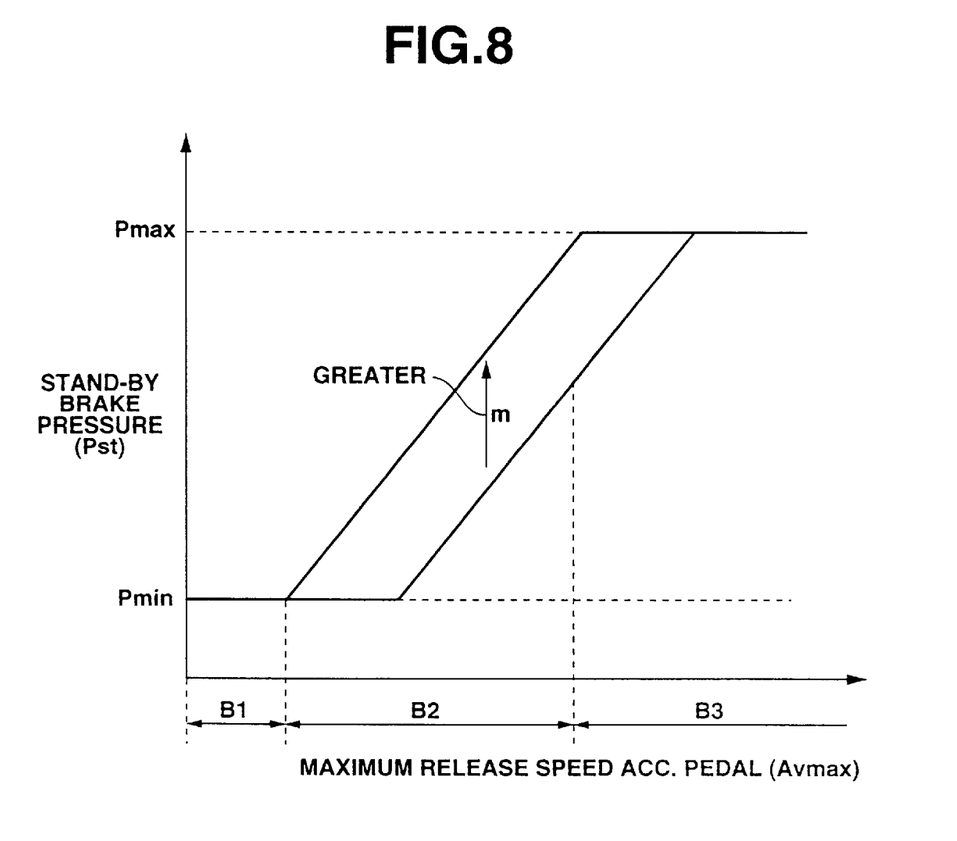
FIG. 8 a characteristic diagram illustrating a map used in calculation of target stand-by brake pressure in the control routine of FIG. 7.

At step 146, control unit 29 determines target stand-by brake pressure Pst by performing a table look-up operation of the illustrated map in FIG. 8 using Avmax and weight m. At the next step 148, control unit 29 sets state representative flag FS equal to 1 (one). After step 148, the routine proceeds to flag 120.

If, at step 134, accelerator pedal 27 is released, the routine proceeds to step 150. At step 150, control unit 29 determines whether or not flag FS is set (FS=1). If this is the case, the routine proceeds to step 120. If, at step 150, FS is not equal to 1, the routine proceeds to step 152 before proceeding to step 120. At step 152, control unit 29 sets minimum Pmin as target stand-by brake pressure Pst.

Referring to FIG. 8, the illustrated Pst characteristic against Avmax and m was prepared on the recognition that, with the same stand-by pressure Pst, deceleration perceived by the vehicle operator becomes less because of high degree of emergency if the accelerator pedal is released quickly and also on the recognition that, with the same stand-by brake pressure Pst, deceleration perceived by the vehicle operator becomes less as the weight m becomes greater. The characteristic is such that Pst has its minimum value Pmin over small range B1 of Avmax and it has its maximum value Pmax over large range B3 of Avmax. Over intermediate range B2, Pst varies between Pmin and Pmax and is proportional to Avmax. As illustrated by an arrow in FIG. 8, stand-by pressure Pst is corrected with vehicle weight m such that at the same Avmax, stand-by pressure Pst drops as weight m drops.

Figure 9:
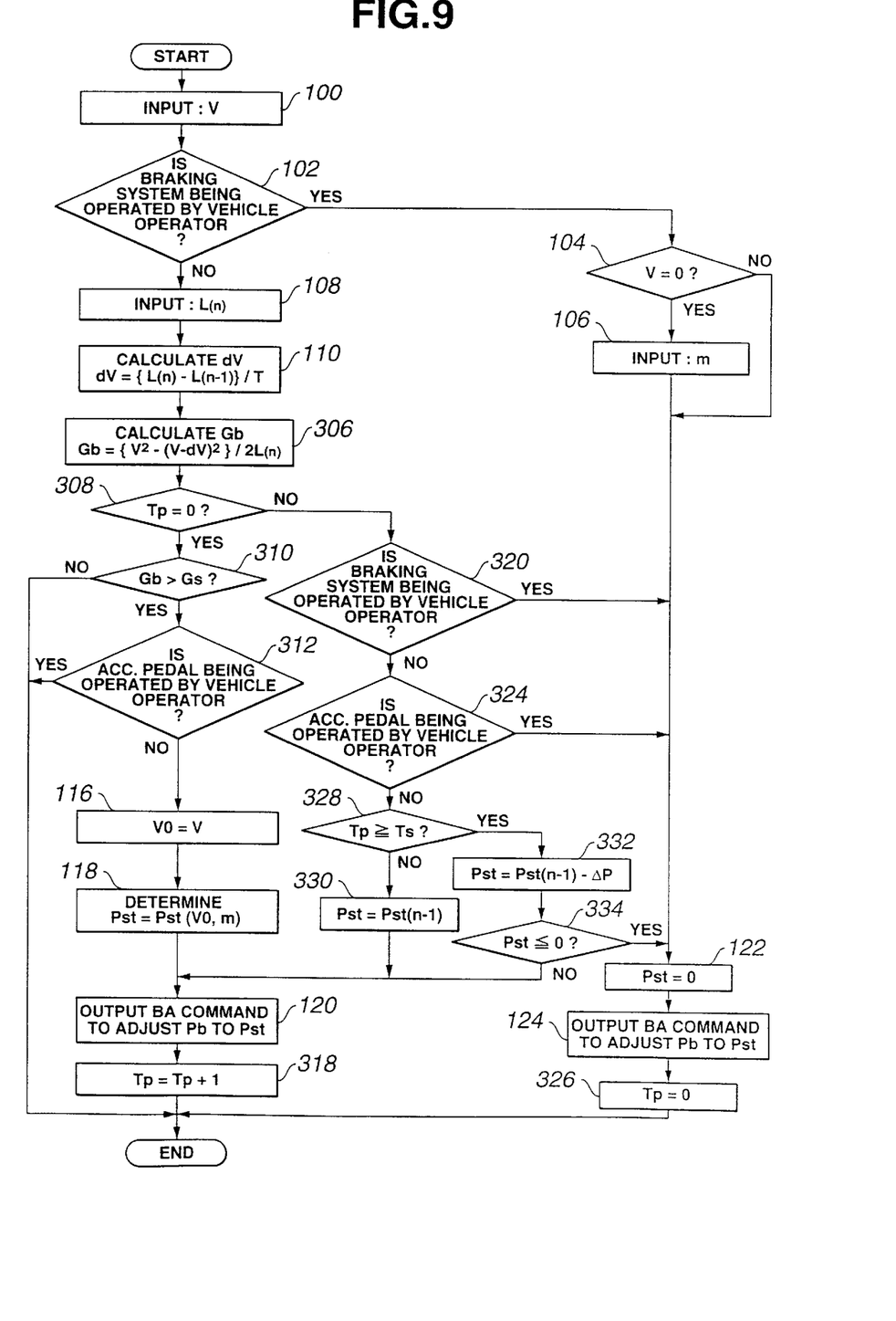
FIG. 9 is a flow chart of a control routine for regulating stand-by brake pressure applied to the brake in stand-by state, illustrating a further embodiment of stand-by braking process.

The flow chart of FIG. 9 illustrates a further control routine implementing the present invention. This control routine is executed at regular interval of 10 milliseconds by timer interruption. This control routine is substantially the same as the previously described control routine illustrated in FIG. 5 except the criterion used to trigger stand-by brake pressure regulation and the manner of regulating the determined target stand-by brake pressure Pst. Comparing FIG. 9 with FIG. 5 reveals that new steps 306, 308, 310 and 312 have replaced steps 112 and 114 (see FIG. 5) and disposed between steps 110 and 116, and new steps 318 and 326 are disposed after steps 120 and 124, respectively. Further, new steps 320, 324, 328, 330, 332 and 334 are connected in parallel to steps 310, 312, 116 and 118.

In FIG. 9, the routine proceeds from step 110 to step 308. At step 308, control unit 29 determines target deceleration Gb from traveling speed V, relative speed dV and distance L(n) by calculating the following equation, $$Gb = \{V^2 - (V-dV)^2\}/2L(n) \qquad (4)$$

At the next step 308, control unit 29 determines whether or not the content of counter Tp is equal to 0 (zero). If this is the case (Tp=0), the routine proceeds to step 310. At step 310, control unit 29 determines whether or not target deceleration Gb is greater in magnitude than a criterion deceleration Gs, which is 0.6 G in this example. If Gb≦Gs, the routine is terminated. If, at step 310, Gb>Gs, the routine proceeds to step 312. At step 312, control unit 29 determines whether or not accelerator pedal 27 is being operated by vehicle operator by determining whether or not accelerator stroke L(n) is greater than zero. If, at step 312, accelerator pedal 27 is depressed, the routine is terminated. If, at step 312, accelerator pedal 27 is released, the routine proceeds to steps 116, 118 and 120 where control unit 29 determines target stand-by brake pressure Pst in the same manner as illustrated in FIG. 5. After step 120, the routine proceeds to step 318. At step 318, control unit 29 performs increment of the content of timer Tp before terminating the routine.

Subsequently, since Tp is no longer zero, the routine proceeds from step 308 to step 320. At step 320, control unit 29 determines whether or not braking system 430 is being operated by the vehicle operator, i.e., whether or not brake pedal 23 is depressed. If this is the case, the routine proceeds to steps 122 and 124. After step 124, control unit 29 clears counter Tp (Tp=0) at step 326.

If, at step 320, brake pedal 23 is released, the routine proceeds to step 324. At step 324, control unit 29 determines whether or not accelerator pedal 27 is being operated by vehicle operator by determining whether or not accelerator stroke L(n) is greater than zero. If this is the case, the routine proceeds to step 122.

If, at step 324, accelerator pedal 27 is released, the routine proceeds to step 328. At step 328, control unit 29 determines whether or not the content of timer Tp is equal to or greater than a preset value Ts, which represents 1 second in this example. If, at step 328, Tp<Ts, the routine proceeds to step 330. At step 330, control unit 29 leaves sets the previous stand-by pressure Pst(n−1) as the current target stand-by pressure Pst, thus leaving the stand-by pressure unaltered. After step 330, the routine proceeds to steps 120 and 318.

If, at step 328, Tp≧Ts, the routine proceeds to step 332. At step 332, control unit 29 decreases the previous stand-by pressure Pst(n−1) by ΔP and sets the result as the current stand-by pressure Pst. At the next step 334, control unit 29 determines whether or not the current Pst is equal to 0 (zero). If, at step 334, Pst>0, the routine proceeds to step 120. If, at step 334, Pst is equal to or less than 0, the routine proceeds to step 122.

Figure 10:
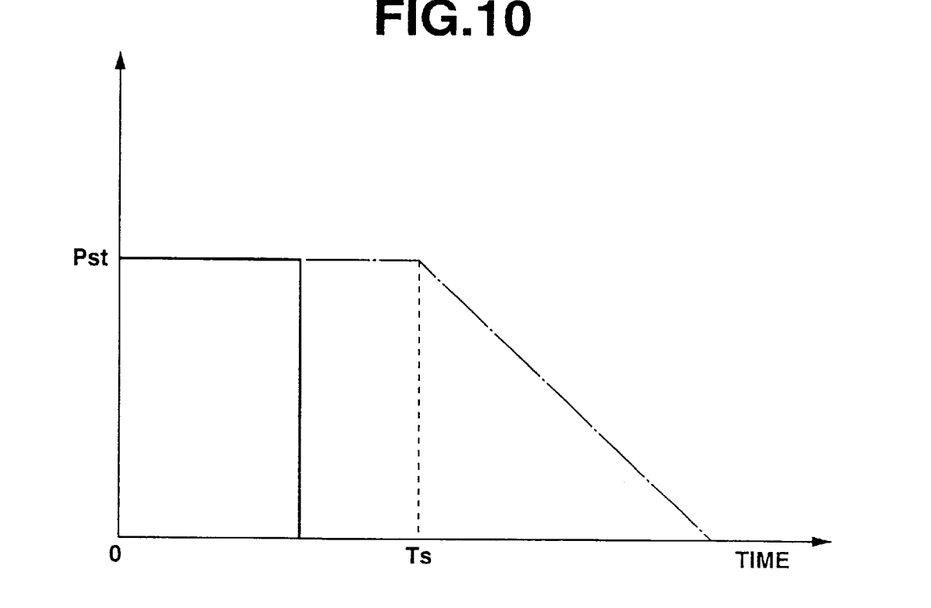
FIG. 10 is a time chart illustrating, by the fully drawn line, the variation of target stand-by brake pressure if a brake pedal is depressed immediately after an accelerator pedal has been released.

The one-dot chain line in FIG. 10 illustrates the variation of target stand-by brake pressure Pst according to the control routine of FIG. 9. In FIG. 10, the fully drawn line illustrates an event that brake pedal 23 is depressed before expiration of Ts. It should be noted that the target stand-by brake pressure Pst that is determined upon determination that Gb has exceeded Gs will be held unaltered till the moment Ts and gradually drops to zero if the brake pedal 23 and accelerator pedal 27 are both held released.

Figure 11:
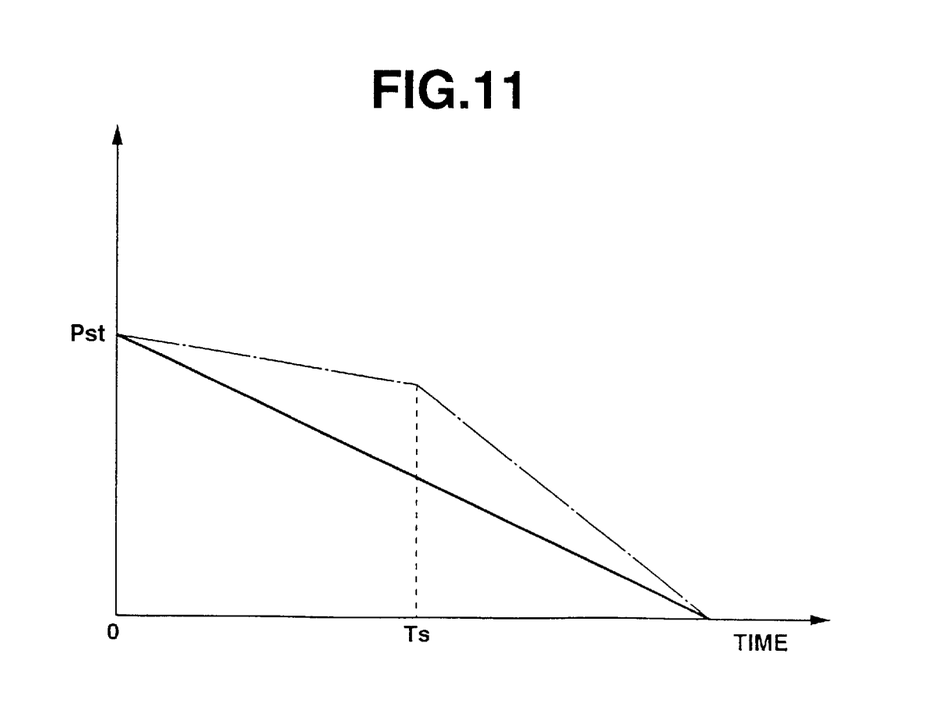
FIG. 11 is a time chart illustrating, by one dot chain line, another example of the variation of target stand-by brake pressure if the brake pedal is left at its released position after an accelerator pedal has been released, and, by the fully drawn line, further example of the variation of target stand-by brake pressure if the brake pedal is left at its released position after the accelerator pedal has been released.

The variation of target stand-by brake pressure Pst is not limited to the example shown in FIG. 10. FIG. 11 shows two other examples of variation of target stand-by brake pressure Pst. The fully drawn line in FIG. 11 shows reduction of Pst at a one-dot chain line in FIG. 11 shows reduction of Pst at a very slow rate till the moment Ts and at a rapid rate after the moment Ts.

Figure 12:
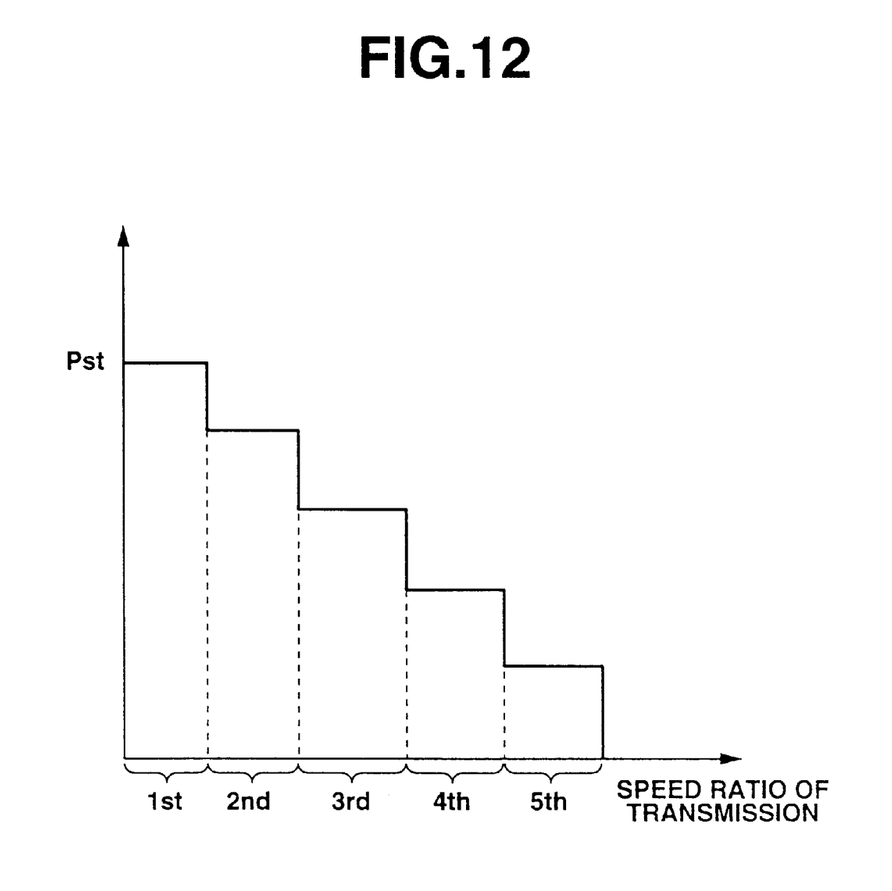
FIG. 12 is a characteristic diagram illustrating a map that may be used in calculation of target stand-by brake pressure in the control routine of FIG. 5 or 7 or 9.

The parameters used to determine Pst are not limited to the examples described above. Referring to FIG. 12, a speed ratio of the transmission can be used as a parameter in determining Pst. In this case, the level of Pst can be increased as speed ratio varies 5th, 4th, 3rd, 2nd and 1st as illustrated in FIG. 12. Since the effectiveness of engine braking increases as the speed ratio becomes low, the brake pressure can be increased without causing any interference with perception of the vehicle operator, ensuring stand-by brake pressure regulation, which can provide highly effective braking.

While the present invention has been particularly described in conjunction with the preferred implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-251971, filed Sep. 6, 1999, is hereby incorporated by reference in its entirety.

What is claimed is:

1. An apparatus for assisting vehicle operator braking action of a vehicle, comprising:

a detection system that detects obstacles located in or near the direction of motion of the vehicle;

vehicle condition sensors that provide characteristic parameters of the condition of the vehicle;

operator demand sensors that provide operator demand;

a control unit that determines whether braking action is needed from data concerning the obstacles, the characteristic parameters of vehicle condition and the operator demands on the vehicle and determines a target stand-by brake pressure, said control unit being operable to generate a command for adjustment of brake pressure to said determined stand-by brake pressure; and a braking system operable by the vehicle operator, said braking system being operable in response to said command to trigger stand-by brake pressure regulation upon said control unit determining that braking action is needed.

2. The apparatus as claimed in claim 1, wherein said control unit increases the target stand-by brake pressure as speed ratio in a transmission, which is available upon said control unit determining that braking action is needed, decreases.

3. The apparatus as claimed in claim 1, wherein said control unit increases the target stand-by brake pressure as traveling speed of the vehicle, which is available upon said control unit determining that braking action is needed, increases.

4. The apparatus as claimed in claim 1, wherein said control unit increases the target stand-by brake pressure greater as the maximum release speed of an accelerator pedal of the vehicle, which is available upon said control unit determining that braking action is needed, increases.

5. The apparatus as claimed in claim 1, wherein said control unit increases the target stand-by brake pressure as weight of the vehicle increases.

6. The apparatus as claimed in claim 1, wherein said control unit continuously calculates a target deceleration as a function of a distance between the vehicle and an obstacle and a relative speed between the vehicle and an obstacle and wherein said control unit determines that braking action is needed immediately after said control unit has determined that the magnitude of said calculated target deceleration has exceeded a predetermined magnitude of deceleration.

7. The apparatus as claimed in claim 1, wherein said target stand-by brake pressure determined by said control unit is a function of travelling speed of the vehicle.

8. The apparatus as claimed in claim 1, wherein said target stand-by brake pressure determined by said control unit is a function of weight of the vehicle.

9. The apparatus as claimed in claim 1, wherein said target stand-by brake pressure is a function of accelerator pedal release speed upon returning movement of an accelerator pedal of the vehicle toward a released position thereof.

10. The apparatus as claimed in claim 1, wherein said target stand-by brake pressure is a function of coefficient of friction between road tires of the vehicle and the surface of a roadway on which the vehicle is travelling.

11. The apparatus as claimed in claim 1, wherein said target stand-by brake pressure is a function of a speed ratio established by a transmission of the vehicle.

12. The apparatus as claimed in claim 1, wherein said target stand-by brake pressure drops in response to time elapsed since said control unit has determined that braking action was needed.

13. The apparatus as claimed in claim 1, wherein said target stand-by brake pressure gradually drops as time elapses since said control unit has determined that braking action was needed.

14. The apparatus as claimed in claim 1, wherein said target stand-by brake pressure remains unaltered for a preset period of time since said control unit has determined that braking action was needed and drops gradually as time elapses thereafter.

15. The apparatus as claimed in claim 1, wherein said target stand-by brake pressure drops to zero upon elapse of a preset period of time since said control unit determined that braking action was needed.

16. The apparatus as claimed in claim 1, where said target standby brake pressure drops to zero when said control unit determines an actual braking action.

17. The apparatus as claimed in claim 1, wherein said target stand-by brake pressure drops to zero when said control unit determines an actual accelerating action.

18. The apparatus as claimed in claim 1, wherein said braking system is operable in response to said command to trigger a stand-by state requiring stand-by brake pressure regulation upon said control unit determining that braking action is needed, and wherein the stand-by state is terminated upon the control unit determining an acceleration action or a braking action by the vehicle operator.

19. An apparatus for assisting vehicle operator braking action of a vehicle, comprising:
a detection system that detects obstacles located in or near the direction of motion of the vehicle;
vehicle condition sensors that provide characteristic parameters of the condition of the vehicle;
operator demand sensors that provide operator demand;
a control unit that determines whether braking action is needed from data concerning the obstacles, the characteristic parameters of vehicle condition and the operator demands on the vehicle and determines a target stand-by brake pressure, said control unit being operable to generate a command for adjustment of brake pressure to said determined stand-by brake pressure; and
a braking system operable by the vehicle operator, said braking system being operable in response to said command to trigger stand-by brake pressure regulation upon said control unit determining that braking action is needed,
wherein said determined target stand-by brake pressure has an initial level greater than zero immediately after an accelerator pedal of the vehicle has been released by the vehicle operator, but said determined target stand-by brake pressure drops from said initial level toward zero level in response to elapse of time from the moment when the accelerator pedal has been released by the vehicle operator, and wherein said braking system is operable in response to said command to provide brake pressure as high as said determined target pressure.

20. The apparatus as claimed in claim 19, wherein said determined target pressure drops to zero level upon elapse of a preset period of time from the moment when the accelerator pedal has been released by the vehicle operator.

21. The apparatus as claimed in claim 19, wherein said determined target pressure drops from said initial level gradually toward zero in response to elapse of time from the moment when the accelerator pedal has been released by the vehicle operator, and finally drops to zero level.

22. The apparatus as claimed in claim 19, wherein said determined target pressure remains unaltered at said initial level for a preset period of time from the moment when the accelerator pedal has been released by the vehicle operator and drops from said initial level gradually toward zero in response to elapse of time after expiration of said preset period of time, and finally drops to zero level.

23. The apparatus as claimed in claim 19, wherein said determined target pressure drops from said initial level down to zero level upon subsequent depression of the accelerator pedal by the vehicle operator.

24. The apparatus as claimed in claim 19, wherein said determined target pressure drops from said initial level down to zero level upon subsequent depression of a brake pedal of said braking system by the vehicle operator.

25. A method for assisting vehicle operator braking action of a vehicle, comprising:
detecting obstacles located in or near the direction of motion of the vehicle;
providing characteristic parameters of the condition of the vehicle;
providing operator demand;
determining whether braking action is needed from data concerning the obstacles, the characteristic parameters of vehicle condition and the operator demands on the vehicle and determines a target stand-by brake pressure;
generating a command for adjustment of brake pressure to said determined stand-by brake pressure; and
triggering stand-by brake pressure regulation in response to said command upon said control unit determining that braking action is needed.

26. The method of claim 25, wherein in the triggering a stand-by brake pressure regulation step, a stand-by state is triggered requiring stand-by brake pressure regulation in response to said command upon said control unit determining that braking action is needed; and further comprising:
terminating the stand-by state upon determining an acceleration action or a braking action by the vehicle operator.

27. A apparatus for assisting vehicle operator braking action of a vehicle, comprising:
means for detecting obstacles located in or near the direction of motion of the vehicle;
means for providing characteristic parameters of the condition of the vehicle;
means for providing operator demand;
means for determining whether braking action is needed from data concerning the obstacles, the characteristic parameters of vehicle condition and the operator demands on the vehicle and determines a target stand-by brake pressure;

means for generating a command for adjustment of brake pressure to said determined stand-by brake pressure; and means for triggering requiring stand-by brake pressure regulation in response to said command upon said control unit determining that braking action is needed.

28. The apparatus of claim 27, wherein the means for triggering stand-by brake pressure regulation comprises means for triggering a stand-by state requiring stand-by brake pressure regulation in response to said command upon said control unit determining that braking action is needed, wherein the stand-by state is terminated upon determining an acceleration action or a braking action by the vehicle operator.

29. An apparatus for assisting vehicle operator braking action of a vehicle, comprising:

a detection system that detects obstacles located in or near the direction of motion of the vehicle;

vehicle condition sensors that provide characteristic parameters of the condition of the vehicle;

operator demand sensors that provide operator demand;

a control unit that determines whether braking action is needed from data concerning the obstacles, the characteristic parameters of vehicle condition and the operator demands on the vehicle and determines a target stand-by brake pressure, said control unit being operable to generate a command for adjustment of brake pressure to said determined stand-by brake pressure upon said control unit determining that braking action is needed and upon said operator demand sensors providing that there is no operator demand for braking action; and a braking system operable by the vehicle operator, said braking system adjusting the brake pressure to said determined stand-by brake pressure upon the control unit generating said command to trigger stand-by brake pressure, said braking system being operable in response to said command to trigger stand-by brake pressure regulation upon said control unit determining that braking action is needed.

* * * * *